(12) United States Patent
Misner et al.

(10) Patent No.: US 12,408,595 B2
(45) Date of Patent: Sep. 9, 2025

(54) HVAC SYSTEM FOR HYDROPONIC FARM

(71) Applicant: Planted, LLC, Detroit, MI (US)

(72) Inventors: Kai Misner, Detroit, MI (US); Simon Yevzelman, Detroit, MI (US); Kelly Sharpe, Detroit, MI (US); Megan Burritt, Detroit, MI (US); Thomas Adamczyk, Detroit, MI (US)

(73) Assignee: Planted, LLC, Detroit, MI (US)

( * ) Notice: Subject to any disclaimer, the term of this patent is extended or adjusted under 35 U.S.C. 154(b) by 0 days.

(21) Appl. No.: 17/559,274

(22) Filed: Dec. 22, 2021

(65) Prior Publication Data

US 2022/0192105 A1 Jun. 23, 2022

Related U.S. Application Data

(60) Provisional application No. 63/130,101, filed on Dec. 23, 2020.

(51) Int. Cl.
*A01G 9/24* (2006.01)
*A01G 31/06* (2006.01)

(52) U.S. Cl.
CPC .............. *A01G 9/246* (2013.01); *A01G 31/06* (2013.01)

(58) Field of Classification Search
CPC ........... A01G 9/246; A01G 9/24; A01G 31/06
See application file for complete search history.

(56) References Cited

U.S. PATENT DOCUMENTS

| | | | | |
|---|---|---|---|---|
| 4,951,480 A | * | 8/1990 | Brence | F24F 7/025 62/304 |
| 5,146,762 A | * | 9/1992 | Atkins | A01K 1/0052 454/328 |
| 6,079,365 A | * | 6/2000 | Medlin | F24F 1/0007 119/437 |
| 7,350,364 B2 | * | 4/2008 | Meerpohl | A01K 1/0082 62/310 |
| 10,034,435 B2 | * | 7/2018 | Helene | A01G 31/06 |
| 10,716,266 B2 | * | 7/2020 | Tanizawa | A01G 9/247 |
| 10,753,627 B1 | * | 8/2020 | Stevenson | F24F 7/065 |
| 10,925,219 B2 | * | 2/2021 | Nguyen | A01G 7/045 |
| 10,973,177 B2 | * | 4/2021 | Spaans | F24F 3/1417 |
| 11,202,439 B2 | * | 12/2021 | Gribble | A01K 1/0052 |
| 11,477,951 B2 | * | 10/2022 | Speetjens | F03B 7/00 |

(Continued)

FOREIGN PATENT DOCUMENTS

CN 108522091 A * 9/2018
CN 109011960 A * 12/2018

(Continued)

*Primary Examiner* — Joshua D Huson
*Assistant Examiner* — Katherine Anne Kloecker
(74) *Attorney, Agent, or Firm* — Honigman LLP

(57) ABSTRACT

A hydroponic system for optimizing a growing environment is disclosed. The system includes a growth chamber, with one or more growing racks disposed in therein. An air unit is configured to force air into a first end wall and a second end wall on opposite sides of the growth chamber. An exhaust fan is disposed on a top wall and generally centered with respect to the growth chamber. The exhaust fan is configured to draw the forced air out of the growth chamber. A controller controls the make-up air unit and the exhaust fan to achieve a desired vapor pressure deficit.

20 Claims, 12 Drawing Sheets

(56) References Cited

U.S. PATENT DOCUMENTS

| | | | | |
|---|---|---|---|---|
| 2013/0192131 A1* | 8/2013 | Abahusayn | ............. | A01G 9/14 47/17 |
| 2016/0212954 A1* | 7/2016 | Argento | ................ | A01G 31/06 |
| 2018/0160632 A1* | 6/2018 | Voermans | ............. | A01G 9/246 |
| 2022/0039332 A1* | 2/2022 | Avila | ....................... | A01G 9/14 |
| 2022/0201943 A1* | 6/2022 | Parrella | ................... | A01G 7/02 |

FOREIGN PATENT DOCUMENTS

| | | | | | |
|---|---|---|---|---|---|
| CN | 111699885 A | * | 9/2020 | | |
| WO | WO-2020198753 A1 | * | 10/2020 | ............ | A01G 9/023 |

* cited by examiner

HVAC SYSTEM FOR HYDROPONIC FARM

CROSS-REFERENCE TO RELATED APPLICATION

This patent application claims the benefit of U.S. Provisional Patent Application No. 63/130,101 filed on Dec. 23, 2020, which is hereby incorporated by reference in its entirety.

FIELD

The present disclosure relates generally to a controlled environment system for growing plants, and more specifically to a hydroponic system that allows for monitoring and manipulation of temperature and humidity of an enclosed space for optimum plant growth.

BACKGROUND

Hydroponics provides a method of growing plants and other vegetation in an aqueous nutrient solution rather than in a nutrient based soil. With such systems, farmers are able to grow plants indoors, with controlled temperature, lighting, and nutrient irrigation schedules to increase plant production. Moreover, such systems also permit use of vertical space, thereby increasing production and plant density in a limited space. Further, hydroponics allow the creation of farms in locations where soil conditions or climate are unconducive to support traditional farming, and where space is limited.

Indoor hydroponic systems also provide an advantage over traditional growing in greenhouses. For example, greenhouses utilize light rays from the sun which are absorbed by the plants and the soil and converted into heat energy in the form of infrared wavelengths. Accordingly, greenhouses require access to sun light. As such, greenhouses are not suited for urban areas, where nearby buildings may block the sun's rays, nor in geographical areas of limited direct sunlight, such as the Midwest region of the United States. Moreover, greenhouses are still subjected to environment constraints that limit growing options with the change of season. For instance, the amount of heat converted by the plants and soil may not be sufficient for optimal plant growth, as such conventional greenhouses require a heater, such a gas or electric heater to warm the greenhouse during relatively colder seasons. Lastly, greenhouse environmental control parameters tend to vary more significantly than indoor controlled environment facilities due to construction materials, R-value of insulation, and heat and humidity traps.

In contrast, because indoor hydroponic systems are not dependent upon access to sunlight and may be built vertically such that space may be maximized for growing, they are desirable over traditional farming and greenhouse farming. For example, hydroponic systems allow for farming in urban areas where space is not available for traditional or greenhouse farming. However, there still exists a need to control heat and humidity in a grow room of a hydroponic system.

Known indoor hydroponic systems utilize dehumidifiers and traditional air conditioning units to maintain desirable humidity and temperature for plant growth. This type of an arrangement is expensive to operate, but there are also thresholds on the capacity that the dehumidifier and air conditioning units can effectively handle. Accordingly, the size of a grow room using such an arrangement is limited.

What is needed is a system that permits increased growing capacity, but minimizes cost to operate, while still effectively controlling the environment within a grow room.

SUMMARY

Disclosed herein is a hydroponic system for optimizing a growing environment. The hydroponic system includes a first side wall, a second side wall, a first end wall, a second end wall, a bottom surface and a top wall coupled together to define a growth chamber, the first end wall opposite of the second end wall. One or more growing racks are disposed in the growth chamber. The first end wall includes a first cavity and a first opening open to the growth chamber and the second end wall includes a second cavity and a second opening open to the growth chamber. An air unit is configured to force air into first end wall and the second end wall. An exhaust fan is disposed on the top wall and is generally centered with respect to the growth chamber, the exhaust fan is configured to draw the forced air out of the growth chamber. A controller is configured to control the air unit and the exhaust fan to achieve a desired vapor pressure deficit. Vapor-pressure deficit, or VPD, is the difference between the amount of moisture in the air and how much moisture the air can hold when it is saturated. Once air becomes saturated, water will condense out to form clouds, dew or films of water over leaves.

In one aspect of the hydroponic system, the air unit includes a first louver, wherein the first louver is configured to move between an open and closed position so as to control an intake of air from the environment.

In one aspect of the hydroponic system, the air unit includes a heating element configured to heat the air forced into the growth chamber.

In one aspect of the hydroponic system, the air unit further includes a filter to inhibit bacteria growth.

In one aspect of the hydroponic system, the air unit is a pair of air units, one of the pair of air units is fluidly coupled to the first cavity of the first end wall, and the other of the pair of air units is fluidly coupled to the second cavity of the second end wall.

In one aspect, the hydroponic system further includes at least one evaporative cooling pad disposed on the first opening of the first end wall, wherein air forced into the growth chamber is directed through the evaporative cooling pad and at least one evaporative cooling pad disposed on the second opening of the second end wall, wherein air forced into the growth chamber is directed through the evaporative cooling pad.

In one aspect of the hydroponic system, at least one evaporative cooling pad is a pair of evaporative cooling pads, each of the pair of evaporative cooling pads is disposed on a vertical plane. In such an aspect, a second louver is disposed in each of the first end wall and the second end wall, the second louver disposed between the pair of evaporative cooling pads and adjustable so as to control the flow of air to a respective one of the pair of evaporative cooling pads.

In one aspect, the hydroponic system further includes a temperature sensor configured to detect the temperature of the growth chamber, the controller processing the detected temperature to adjust the heat output of the air unit or at least one of the plurality of lights configured to generate heat.

In one aspect, the hydroponic system further includes an air speed sensor configured to detect the speed of the air flow in the growth chamber, the controller processing the speed of the air flow to the output of at least one of the air units and exhaust fans.

In one aspect, the top wall further includes top opening, the exhaust fan is operable to draw air from the growth chamber and release the drawn air into the environment through the top opening.

In one aspect, the hydroponic system further includes a third louver operatively connected to the top opening, the controller configured to actuate the third louver so as to control the release of drawn air into the environment.

In one aspect, the hydroponic system further includes a duct fluidly connecting the top opening to the air unit so as to recirculate the air and form a closed system.

In one aspect, the hydroponic system further includes a water supply operatively coupled to the at least one evaporative cooling pad.

In one aspect, the hydroponic system further includes a pump configured to supply water from the water supply to the at least one evaporative cooling pad.

In one aspect, the controller is configured to actuate the pump to control the amount of water to the at least one evaporative cooling pad.

BRIEF DESCRIPTION OF THE DRAWINGS

Exemplary embodiments of the present disclosure will now be described in greater detail with reference to the attached figures, in which.

DETAILED DESCRIPTION

Figure 1:
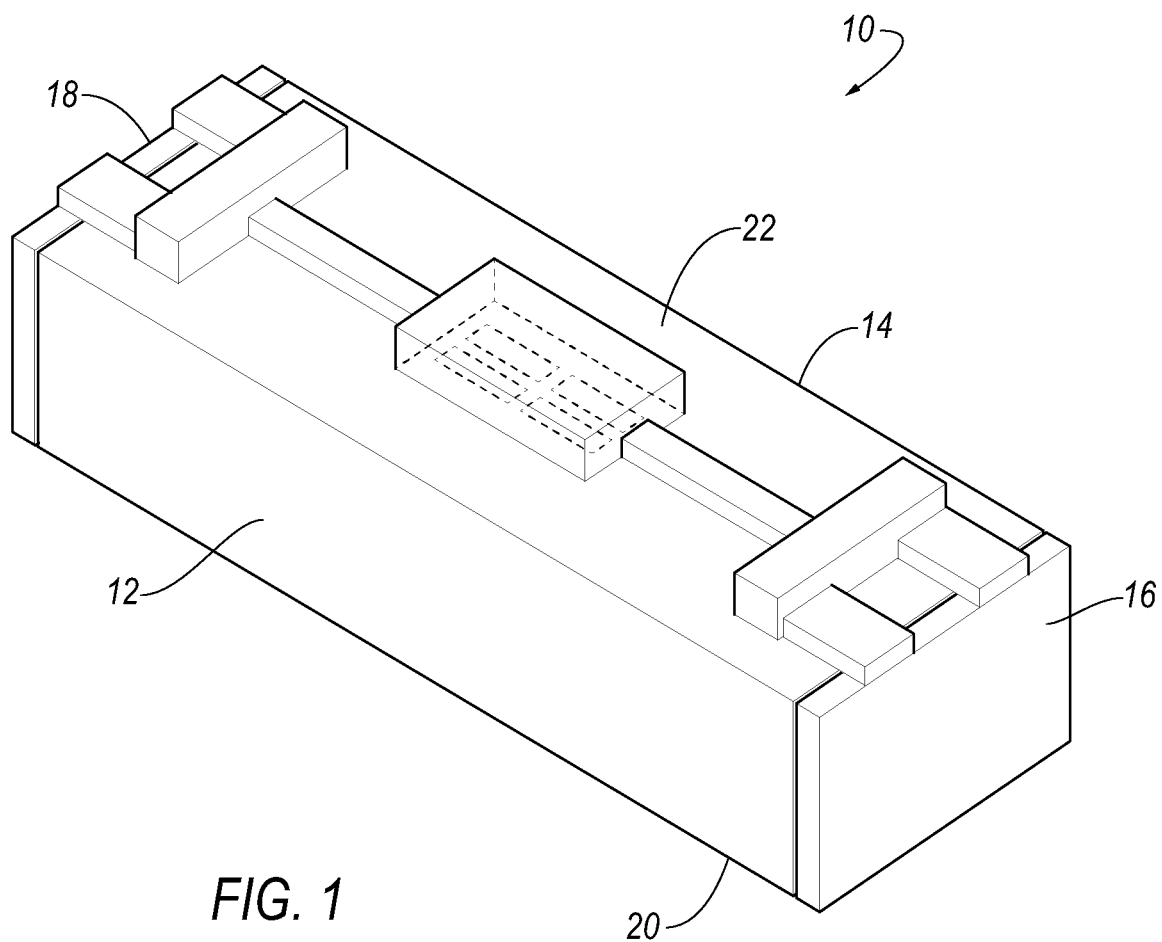
FIG. 1 is a perspective view of an enclosed growing room for a hydroponic farm having an HVAC System in accordance with one aspect of the disclosure.

Referring now to the discussion that follows and also to the drawings, illustrative approaches to the disclosed devices are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Figure 2A:
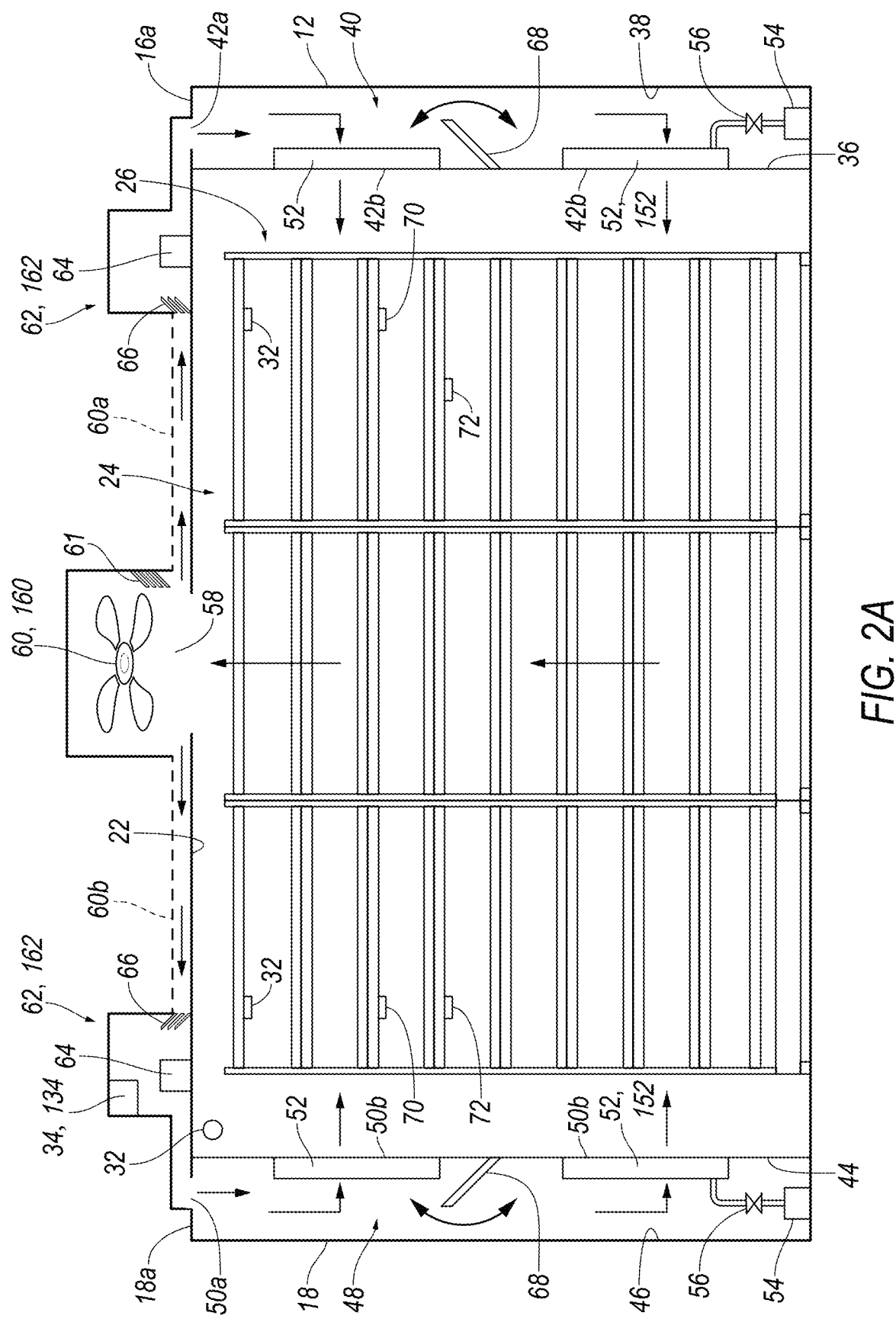
FIG. 2A cross-sectional view of the growing room in FIG. 1 taken along line 2A-2A.
Figure 2B:
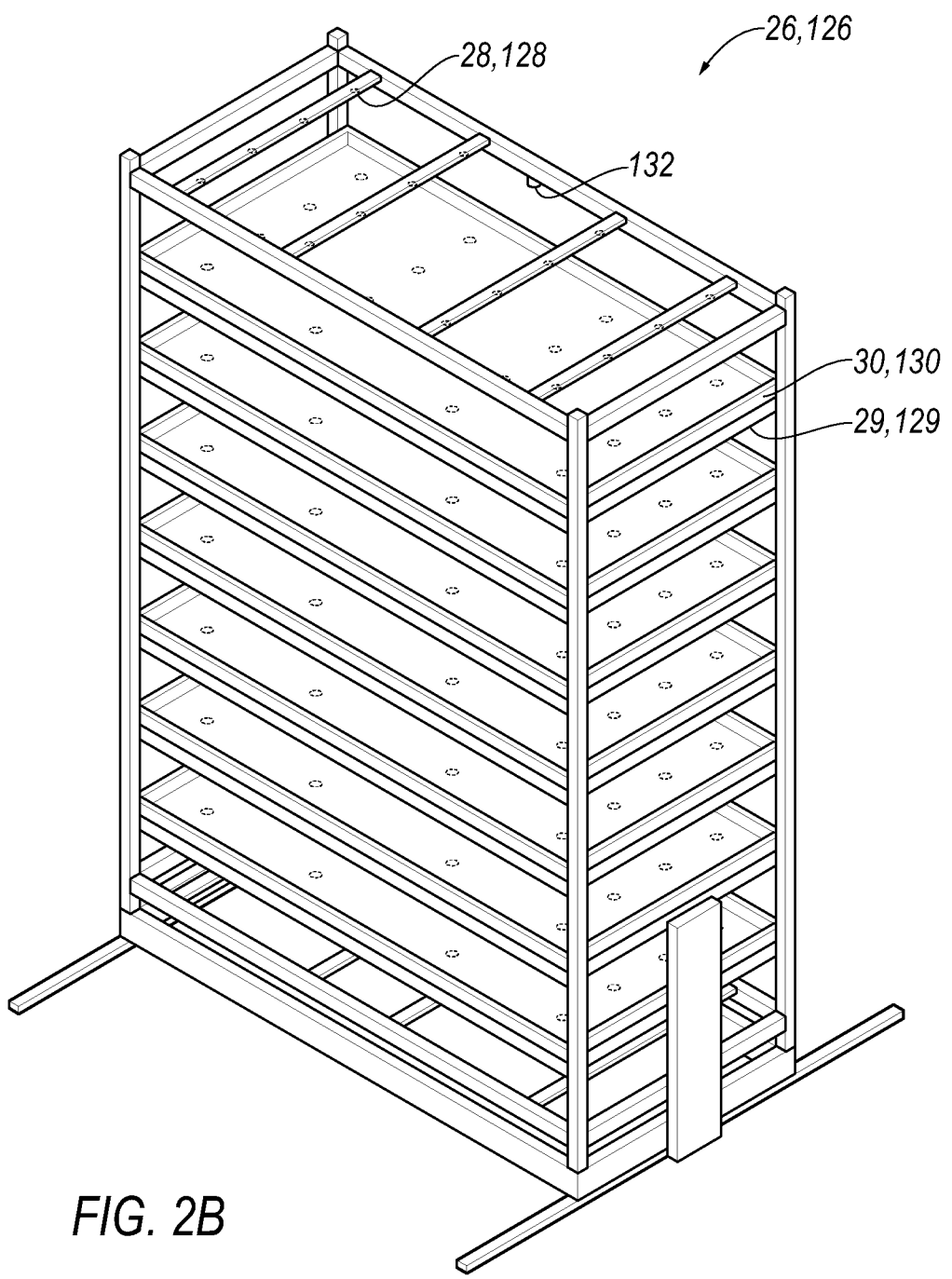
FIG. 2B is a perspective view of an illustrative growing rack for use in the growing room disclosed herein.

With reference to FIGS. 1-2B, a first exemplary arrangement of a hydroponic system 10 is illustrated. The hydroponic system 10 includes a first wall 12, a second wall 14, first end wall 16, a second end wall 18, a bottom surface 20 and a top wall 22 coupled together to enclose a growth chamber 24. The bottom surface 20 and the top wall 22 define a floor and a cover of the growth chamber 24. As shown in FIG. 2A, disposed within enclosed space 11 is one or more growing racks 26. A perspective view of the growing rack 26 is shown in FIG. 2B. Each growing rack 26 includes a lighting unit 28 and a nutrient trough 29. Plants (not shown) are disposed in the growing racks 26 that are defined by vertically arranged shelves 30 with the roots thereof being disposed within a nutrient trough disposed on the shelf. The shelves 30 are disposed beneath an upper lighting unit 28 disposed on an upper rack of the growing rack 26, while additional light units 28 (indicated in hidden line by the circle) is disposed on a bottom surface of a nutrient trough 29. A stream of nutrient rich water passes through the trough and thus the roots. The lighting unit 28 includes a plurality of lights 28a which are preferably disposed so as to be directed to the top of the plants. There can be any number of different shelves 30 of the growing racks 26 in the vertical direction. In one such aspect, the lighting unit 28 includes a plurality of lights 28a disposed on the bottom surface of each of the respective shelves 30 (with the exception of the bottom shelf). In such a manner the plants are configured to receive light from the top of the plants.

The lighting unit 28 is configured to provide the plants with a predetermined wavelength(s) of light. Any lighting unit 28 currently known or later developed may be modified for use herein, illustratively including Light Emitting Diodes, fluorescent lights, high-intensity discharge lights or the like. A heat sensor 32 may be positioned within the growth chamber 24 so as to detect the temperature of the growth chamber 24. In one aspect, a plurality of heat sensors 32 are positioned in predetermined locations within the growth chamber 24. The heat sensors 32 are in communication with a controller 34 configured to process the temperature detected by the heat sensors 32 and adjust the temperature of the growth chamber 24 in a manner described in more detail below. The controller 34 may be a programmable logic controller or may be a computer operating an executable file written and/or stored on a non-transitory medium.

The first and second end walls 16, 18 are designed as plenums. More specifically, the first end wall 16 is defined by an inside wall member 36 and an outside wall member 38 that are spaced apart from each other to define a first cavity 40 therebetween. A top surface 16a of the first end wall 16 further includes openings 42a and side opening 42b disposed on the inside wall member 36. Accordingly, air is drawn from the exterior of the growth chamber through the opening 42a and is forced into the growth chamber 24 through side openings 42b, as will be explained in further detail below. The second end wall 18 also is defined by an inside wall member 44 and an outside wall member 46 that are spaced away from one another to define a second cavity 48 therebetween. A top surface 18a of the second end wall 18 also includes openings 50a and side openings 50b are disposed on the inside wall member 44. Air is drawn from the exterior of the growth chamber 24 through openings 50a and is forced into the growth chamber 24 through side opening 50b. Accordingly air is drawn from the exterior of the growth chamber 24 and is pushed towards the center of the growth chamber 24 from the respective first and second end walls 16, 18.

In one exemplary arrangement, one or more evaporative cooling pads 52 are disposed within the inside wall members 36 and 44. Evaporative cooling pads 52 are operatively connected to a water supply 54 and a pump 56 to keep the evaporative cooling pad 52 continuously supplied with sufficient water. For illustrative purposes, the bottom evaporative cooling pads 52 within the respective first end wall 16 and second end wall 18 are illustratively shown as connected to the water supply 54 and pump 56; however, it should be appreciated that the upper evaporative cooling pads 52 are also connected to the water supply 54 via the pump 56.

Approximately at the center of the growth chamber 24 are one or more top openings 58 disposed on the top wall 22 through which air may exit the growth chamber 24. In some exemplary arrangements, the air is vented from the growth chamber 24 through the top openings 58 by an exhaust fan 60. Preferably air is forced into a respective first and second end walls 16, 18 by an air unit 62. Preferably, the hydroponic system 10 includes a pair of air units 62, but it should be appreciated that the size and quantity of air units 62 is dependent on the cubic footage of air inside the growth chamber 24. The air units 62 are illustratively shown as being disposed on the top wall 22, but it should be appreciated that the air units 62 may be disposed in other locations which are suitable for forcing are into the respective first and second side end walls 16, 18. The air units 62 are configured to control the rate of airflow into the respective first and second end walls 16, 18. The air units 62 may also include heating elements 64 that allow manipulation of the temperature of the air being delivered to the growth chamber 24 through the first and second end walls 16, 18. As air is forced into the growth chamber 24 from opposite ends, the forced air is drawn through top opening 58 by the exhaust fan 60 into the environment. In such an aspect, an exhaust louver 61 may be coupled to the top opening 58 so as to control the amount of air released into the environment. Alternatively or in addition to, as shown in FIG. 2A, the exhaust fan 60 may be fluidly coupled to a respective air unit 62 via ducts 60b, 60c (shown in dashed lines) wherein the air is recirculated so as to form a closed system.

In one aspect, the air units include a first louver 66 configured to blend recirculated air with air from the environment into the growth chamber 24. In addition, the air units 62 may be provided with UV and/or HEPA filters to inhibit bacteria growth. In another aspect, a second louver 68 is disposed within each of the first and second end walls 16, 18. In such an aspect, each of the first and the second end walls 16, 18 include a pair of cooling pads 52 which are spaced apart from each other along a vertical axis. The second louver 68 is disposed between each of the cooling pads 52. The second louver 68 may be adjusted by the controller 34 so as to control the air flow through each of the pair of cooling pads 52. For instance, it may be preferable to increase the air flow to the upper of the pair of cooling pads 52, in which case the controller 34 or by manual manipulation is operable to angle the second louver so as to direct more air to the upper cooling pad 52. It should be appreciated that the angle of the second louver 68 is determined by the conditions within the growth chamber 24 which may be determined in numerous ways, and is explained below.

A plurality of vapor pressure deficit "VPD" sensors 70 are located at various points in the growth chamber 24. In one exemplary arrangement, the VPD sensors 70 may be disposed at predetermined locations in the growing racks 26 both in the horizontal and vertical directions to detect rapid air exchanges in the growth chamber 24. The sensors 70 are operatively connected to the controller 34 that can be used to target a desired VPD to produce an optimized growing environment within the growth chamber 24. More specifically, VPD is based upon air pressure, air temperature, leaf temperature and relative humidity within a grow room. If VPD is too high, the plants in the grow room will be transpiring heavily and thus absorbing more nutrients, which can cause toxicity. However, if VPD is too low, the plants won't transpire and thus won't be able to take up nutrients, thereby developing deficiencies. As used herein, the sensors 70 may be configured to detect any one of the parameters described above, such as the air pressure, air temperature, leaf temperature and relative humidity. Alternatively, certain parameters may be estimated based upon other conditions. For instance, the leaf temperature may be assumed based upon the air temperature. Thus, the heat sensor 32 may be used to detect the air temperature and the leaf temperature may be assumed as being two degrees less than the detected air temperature. Such parameters/conditions are processed by the controller 34 to actuate the air units, exhaust fan 60 and cooling pads 53 to achieve a desired VPD.

A plurality of air speed sensors 72 are located at various points in the growth chamber 24 to detect the speed of the air flow in the growth chamber 24. The air speed sensors 72 are operatively connected to the controller 34 and can be used to target a desired VPD to produce an optimized growing environment within the growth chamber 124. The hydroponic system 100 utilizes a combination of evaporative cooling pads 52, air units 62 and the sensors 32, 70, 72 to adjust the growing environment within the growth chamber 24 to maintain a proper VPD level in the growth chamber 24 to achieve optimal plant growth.

Unlike prior art systems which use traditional HVAC practices such as air conditioning and dehumidification systems, in one exemplary arrangement, hydroponic system 10 utilizes the controller 34 to operate a combination of evaporative cooling pads 46, air units 62 and the sensors 32, 70 to adjust the growing environment within the growth chamber 24 to maintain a proper VPD level to achieve optimal plant growth. For illustrative purposes, the controller 34 is shown disposed within one of the air units 62. However, it should be appreciated that the controller 34 may be a stand-alone unit that is wired or wireless connected to the air units 63. In addition, the controller 34 may be accessible via a remote server, wherein the parameters of the growth chamber 24 may be adjusted by the user.

With such a control system, the velocity of the air flow can be changed, as well as the temperature to accomplish an optimum growing environment. For instance, if the VPD is too high, the controller 34 may be configured to either increase the speed of the exhaust fan 60 or reduce the air flow generated by the air units 62 to reduce the pressure within the growth chamber 24. In addition, the third louver 60a may be opened fully to allow air to escape into the environment. Naturally, should the VPD be too low, the controller 34 may be configured to either decrease speed of the exhaust fan 60 or increase the air flow generated by the air units 62 to increase the pressure within the growth chamber 24. In addition, the third louver 60a may be closed to prevent air from being released into the environment. In other examples, the heating elements 64 of the air units may be actuated to increase the temperature if needed to maintain an optimal VPD. In another aspect of temperature control, the first louver 66 of the air units 62 may be adjusted to blend air from the environment to control the temperature of the growth chamber 24. Likewise, the humidity may be controlled by controlling the saturation of the cooling pads 52 and air flow through the cooling pads 52 may be adjusted by the controller 34 to achieve a desired humidity optimal for maintaining the desired VPD. In such an aspect, the heat sensor 32 may be disposed within the air unit 62 wherein the heating element 64 and the first louver 66 are actuated by the controller 34 to generate a desired air temperature exiting the air unit 62.

In operation, the air units 62 are actuated so as to force air into the growth chamber 24 through the first and second end walls 16, 18. The first louver 66 may be adjusted to blend air from the environment into the growth chamber 24. The first louver 66 may be configured to be adjusted from an open position to a closed position wherein in an open position air from the environment is fully drawn in and in a closed position air from the environment is blocked. As shown by the arrows in FIG. 2A, air is forced into the first and second end walls 16, 18 wherein the angle of the second louver 68 may be adjusted to selectively control the air flow through the upper and lower cooling pads 52. The position or angle of the louvers 66, 68 may be automatically adjusted by the controller 34 based upon the desired environmental condition. That is, the controller 34 may be programmed to achieve various conditions with respect to temperature, leaf temperature, humidity and VPD based upon the plant being grown. As such, the user may simply select which condition is desired based upon the plant being grown or may manually input the conditions. The air will exit the first and second end walls 16, 18 through the evaporative cooling pads 52 which are disposed over openings 42b and 50b. The conditions of the growth chamber 24 may be achieved, as described above, by further adjusting the rate of draw from the exhaust fan 60.

Figure 5A:
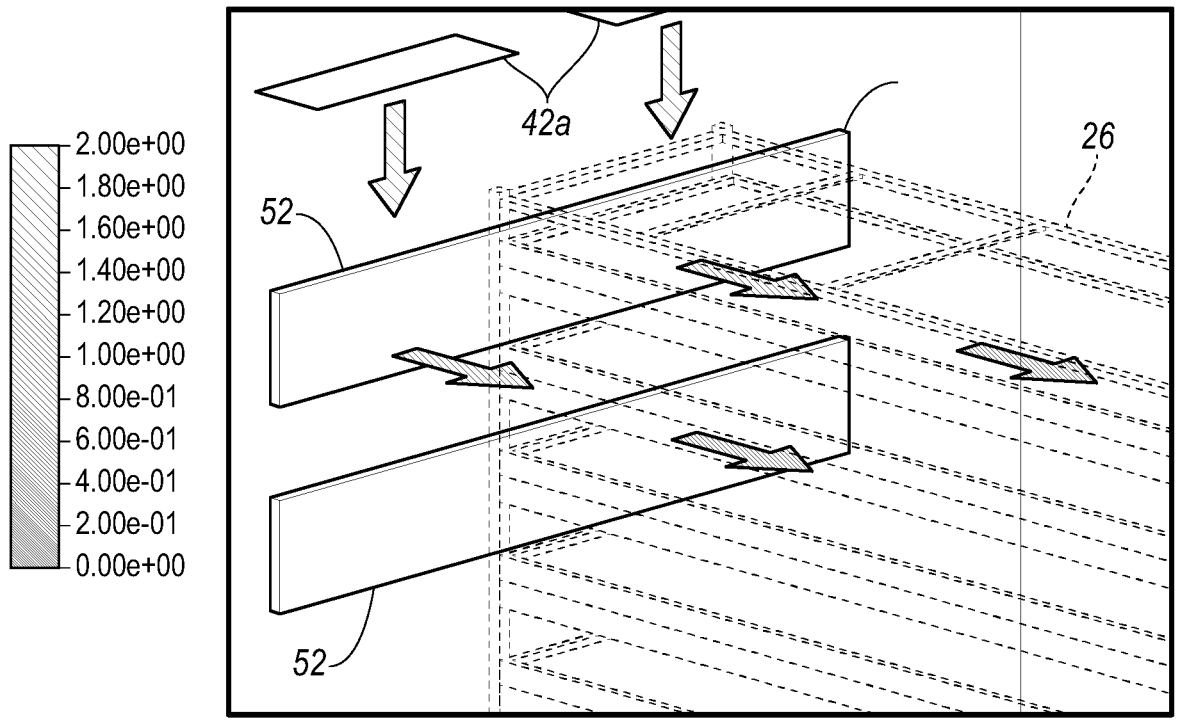
FIG. 5A depicts the air velocity through one side of the grow room shown in FIG. 1.
Figure 5B:
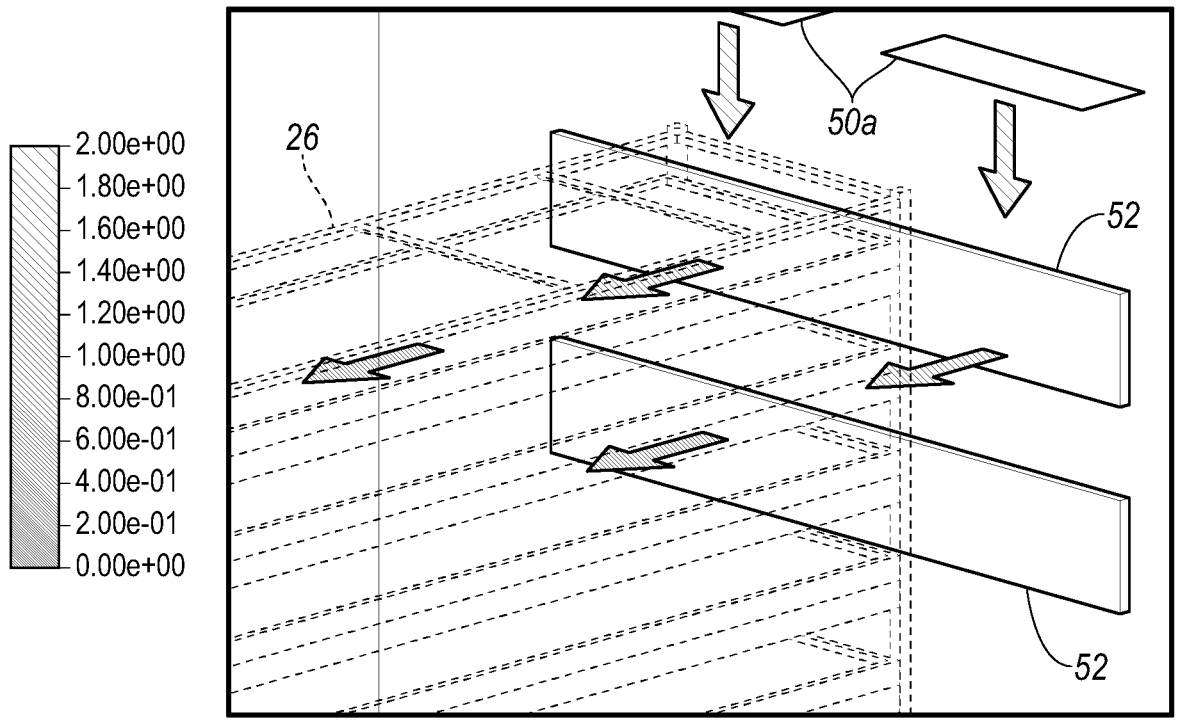
FIG. 5B depicts the air velocity through the other side of the grow room shown in FIG. 1.

As shown in FIGS. 5A-5B, the controller 34 actuates the air units 62, the louvers 66, 68, evaporative cooling pads 46, water supply, pump, and the exhaust fan 60 to maintain a desired condition within the growth chamber. In particular, the air will exit the end walls 16, 18 through the evaporative cooling pads 46, as shown in FIGS. 5A-5B, which will cool the temperature of the air and increase the relative humidity of the air within the enclosed space 11. As shown in the exemplary arrangement of FIGS. 5A-5B, the air velocity is reasonably uniform, with a peak velocity of under 2 m/s. In one exemplary arrangement, the peak velocity is around 1.1 m/s.

Figure 4:
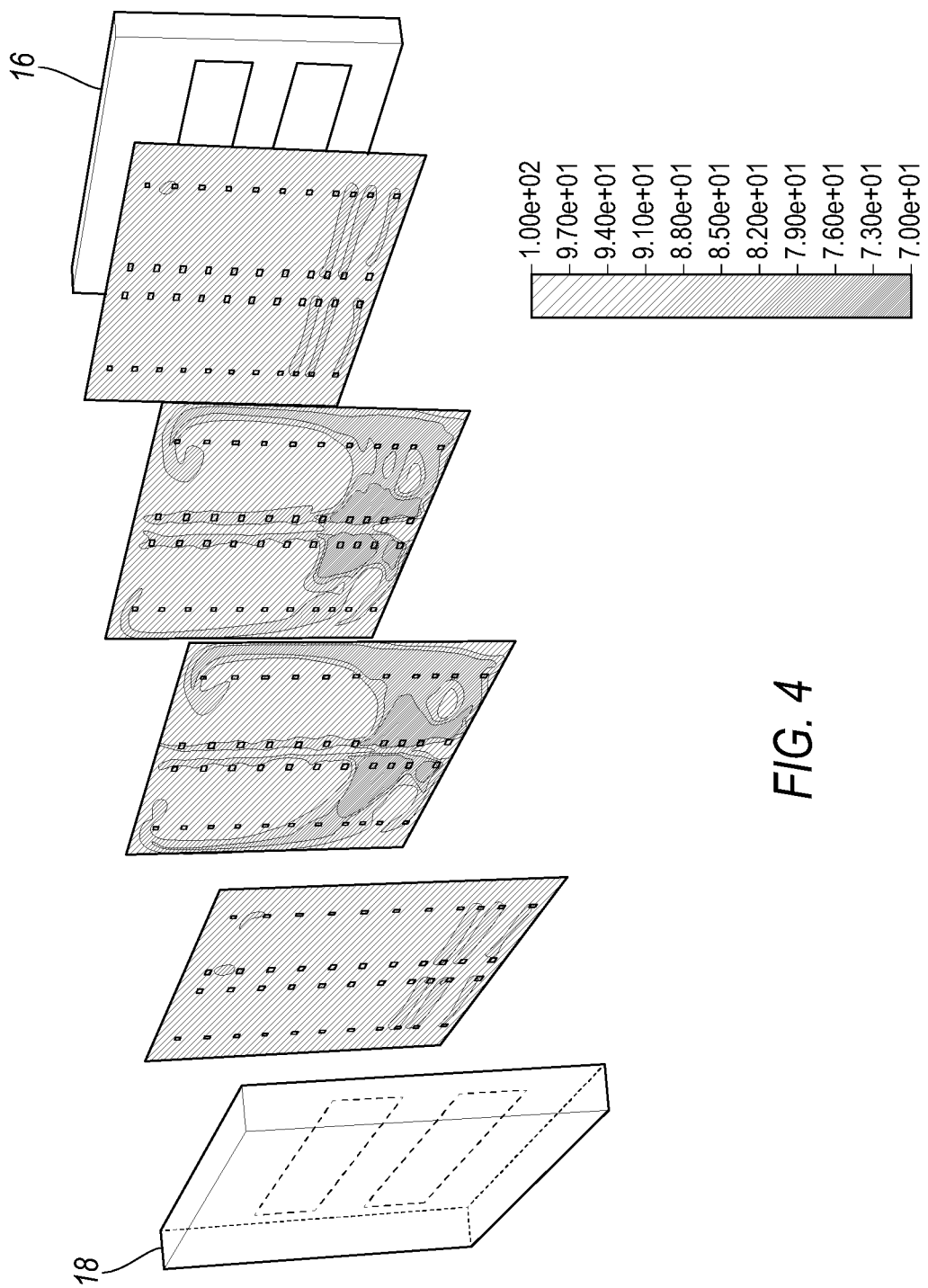
FIG. 4 is a heat map illustrating relative humidity contours throughout the grow room for the arrangement in FIG. 2.
Figure 6:
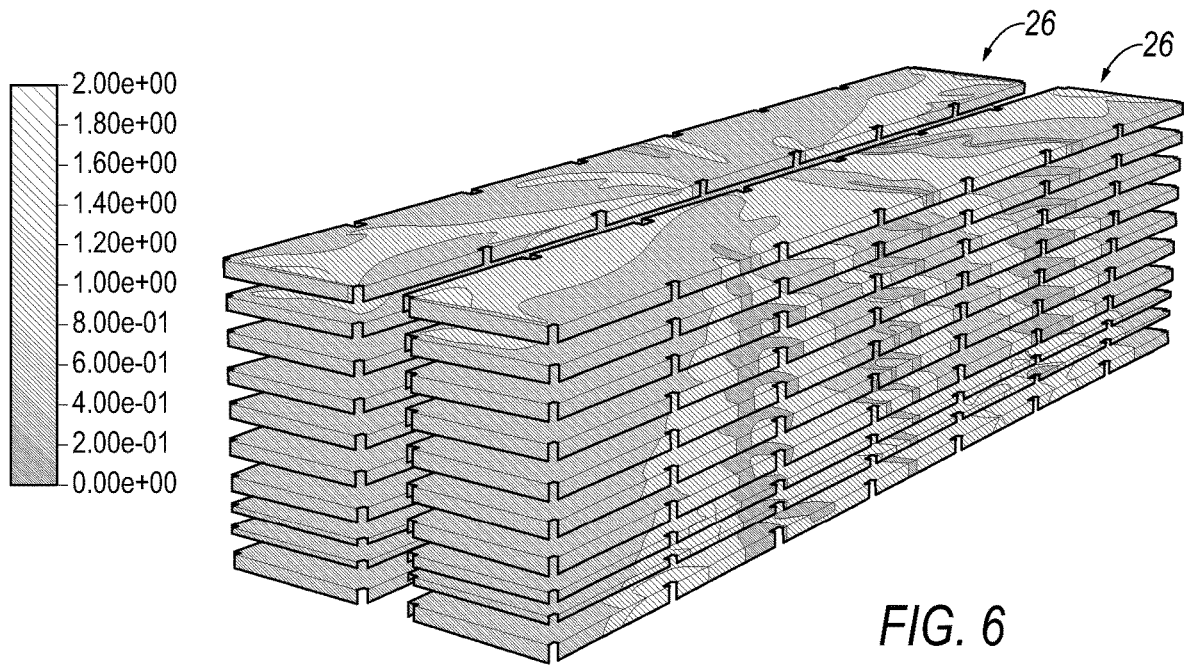
FIG. 6 is a heat map illustrating relative temperatures of plants within the grow room for the arrangement in FIG. 1.
Figure 7:
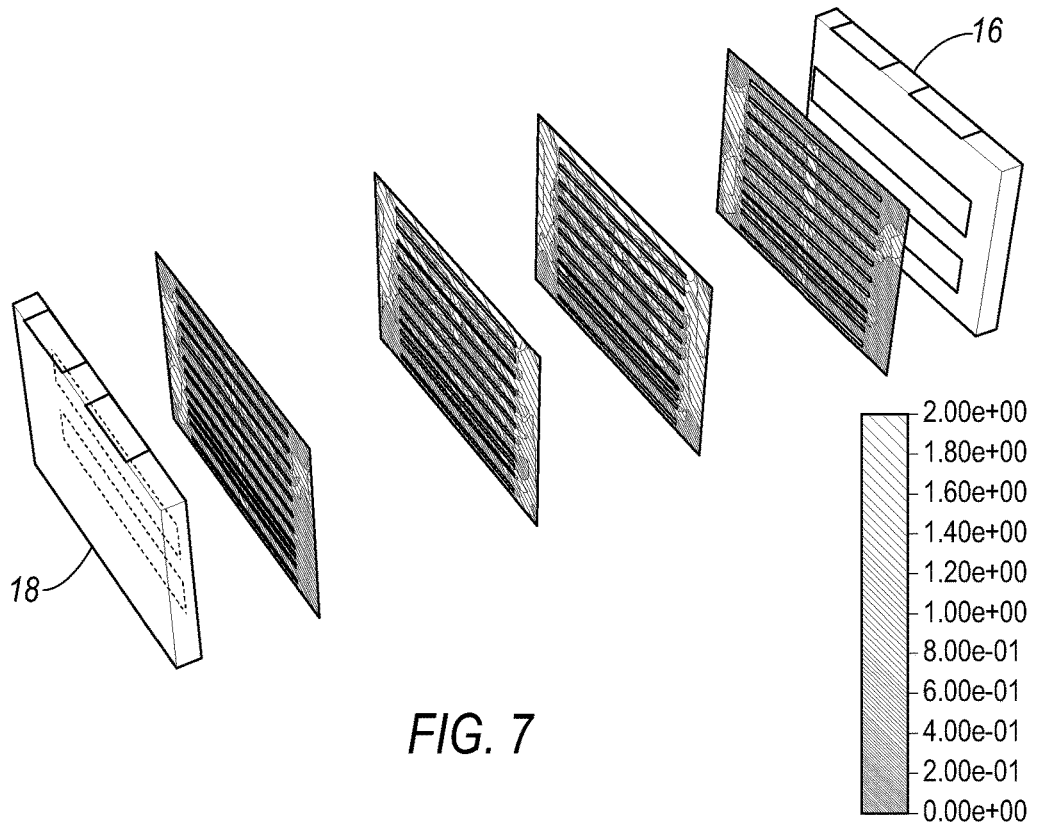
FIG. 7 is a representation of air flow through the grow room for the arrangement in FIG. 1.

As demonstrated in FIG. 7, the exhaust fan 60 located at the top center of the growth chamber 24 will pull the air, which is forced from the respective first end wall 16 and second end wall 18 towards the center of the growth chamber 24, to flow through each vertical plant layer of a respective growing rack 26 at an optimal speed to prevent stagnant air pockets particularly at the center of the growth chamber 24, thereby preventing high humidity levels. Due to the location of the exhaust fan 60 at the center of the growth chamber 24 between the first end wall 16 and the second end wall 18, a desirable turbulence is achieved at the center of the growth chamber 24 that provides an effective growing environment. For example, referring to FIG. 4, a representative heat map of the relative humidity contours throughout the growth chamber 24 is below about 88%. The panels shown between the first end wall 16 and the second end wall 18 are illustrative of sectional views of the growing rack 26. FIG. 4 shows that a slight increase in temperature is experienced at the bottom center of the growth chamber 24, which more than compensates for the increase mass fraction of water at that location such that the relative humidity is low. Indeed, as demonstrated in FIG. 6, due to the constant velocity of the air flow through the growing racks 26, the temperature through the growing racks 26 is also maintained to be relatively consistent throughout their respective length.

Figure 3:
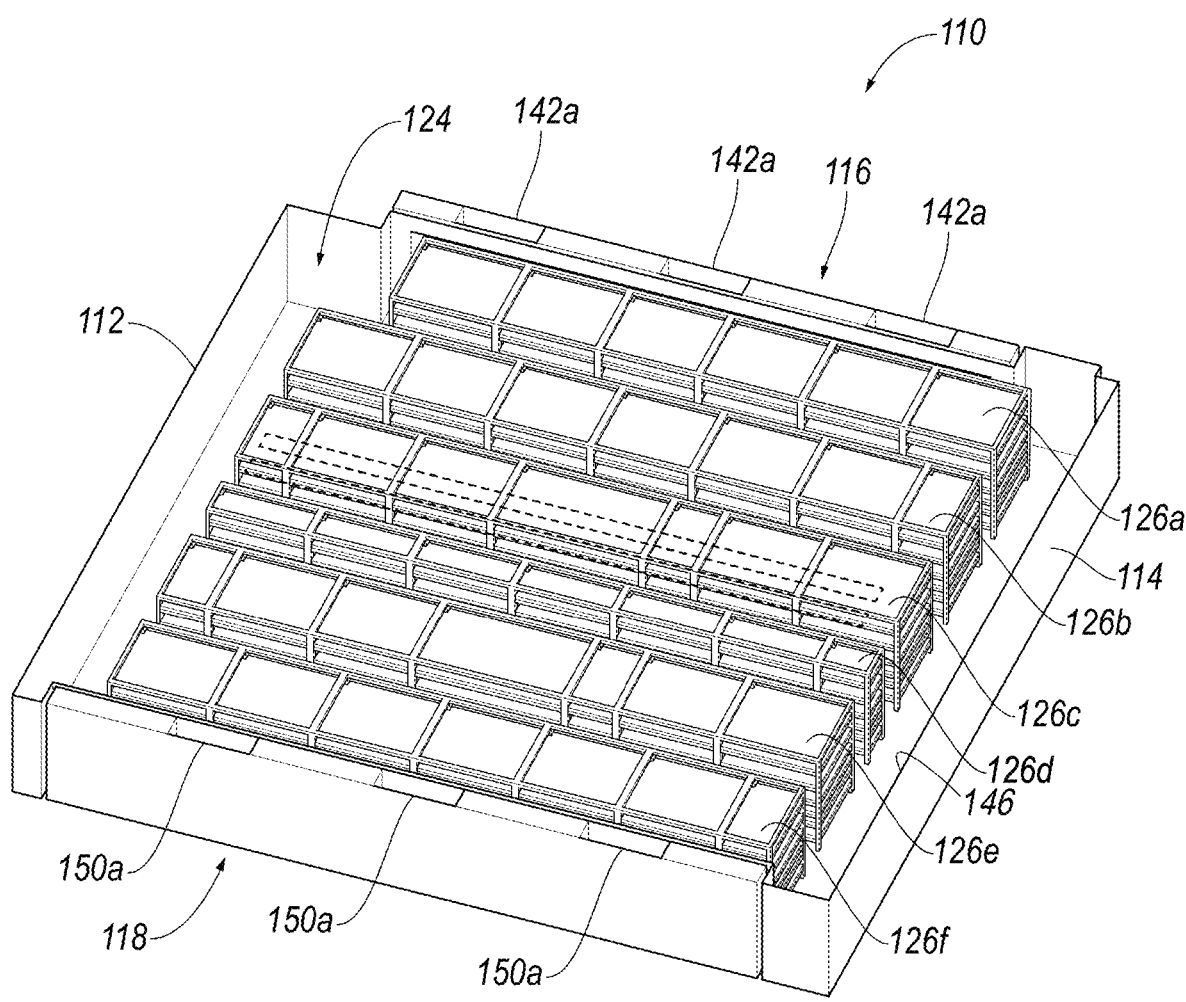
FIG. 3 is a partial cut-away perspective view of an alternative growing room configuration for a hydroponic farm in accordance with one aspect of the disclosure.

Referring to FIGS. 1 and 3, an alternative arrangement of a hydroponic system 110 is illustrated. As the hydroponic system 110 is includes a first wall 112, a second wall 114, a first end walls 116, a second end wall 118, a bottom surface 120 and a top wall 122 coupled together to enclose a growth chamber 124. The bottom surface 120 and the top wall 122 define a floor and a cover of the growth chamber 124. Disposed within growth chamber 124 is one or more growing racks 126a, 126b, 126c, 126d, 126e, 126f. Each growing rack 126a, 126b, 126c, 126d, 126e, 126f includes a lighting unit 128 and a nutrient trough. Plants are disposed in the growing racks 126a, 126b, 126c, 126d, 126e, 126f that are defined by vertically arranged shelves 130 with the roots thereof being disposed within a nutrient trough disposed on the shelf. A stream of nutrient rich water passes through the trough and thus the roots. The lights 128a, 128b are arranged as to be directed to the top of the plants. There can be any number of different shelves of the growing racks in the vertical direction. Moreover, the racks 126a, 126b, 126c, 126d, 126e, 126f in the growth chamber 124 may be configured with different heights and widths. The lighting unit 128 includes a plurality of lights 128a disposed on the bottom surface of each of the respective shelves 130 (with the exception of the bottom shelf). In such a manner the plants are configured to receive light from the top of the plants. The hydroponic system 100 is provided to illustrate that the growth chamber 124 may include any number of growing racks 126 and is not limited to the number of growing racks 26 shown in FIG. 2. Thus, the structure may be generally the same as what is shown in FIGS. 1 and 2.

The lighting unit 128 is configured to provide the plants with a predetermined wavelength(s) of light. Any lighting unit 128 currently known or later developed may be modified for use herein, illustratively including Light Emitting Diodes, fluorescent lights, high-intensity discharge lights or the like. A heat sensor 132 may be positioned within the growth chamber 124 so as to detect the temperature of the growth chamber 124. In one aspect, a plurality of heat sensors 132 are positioned in predetermined locations within the growth chamber 124. The heat sensors 132 are in communication with a controller 134 configured to process the temperature detected by the heat sensors 132 and adjust the components of the hydroponic system 110 to maintain a desired condition within the growth chamber 124, as described in greater detail below. The controller 134 may be a programmable logic controller or may be a computer operating an executable file written and/or stored on a non-transitory medium.

The lighting unit 128 may include a plurality of different lights, the lights may be the same of may be one of or a combination of Light Emitting Diodes, fluorescent lights, high-intensity discharge lights or the like. The controller 134 may selectively actuate each of the lights of the lighting unit 128 to promote the growth of the plants. For instance, the intensity of the light may be varied to optimize plant growth.

The first and second end walls 116, 118 are designed as plenums. More specifically, the first end wall 116 is defined by an inside wall member 136 and an outside wall member 138 that are spaced apart from each other to define a first cavity 140 therebetween. A top surface 116a of the first end wall 16 further includes openings 142a and side openings 142b are disposed on the inside wall member 136. Air is drawn from the exterior of the growth chamber and openings 142b through the openings 142a and is forced into the growth chamber 124 through side openings 142b, as will be explained in further detail below. The second end wall 118 also is defined by an inside wall member 144 and an outside wall member 146 that are spaced away from one another to define a second cavity 148 therebetween. A top surface 118a of the second end wall 118 also includes openings 150a and the inside wall member 144 includes side openings 150b. Air is drawn from the exterior of the growth chamber 124 through opening 150a and is forced into the growth chamber 124 through the side openings 150b, as will be explained in greater detail below.

In one exemplary arrangement, one or more evaporative cooling pads 152 are disposed within the inside wall members 136 and 144. Evaporative cooling pads 152 are operatively connected to a water supply 154 and a pump 156 to keep the evaporative cooling pad 146 continuously supplied with sufficient water. The controller 134 may be programmed to supply a predetermined amount of water to achieve a desired exit temperature and humidity from the respective first and second walls 116, 118 in the growth chamber 124. Preferably, each of the first and second end walls 116, 118 includes a pair of cooling pads 152 spaced apart from each other and disposed on a vertical plane.

Disposed approximately at the center of the growth chamber 124 are one or more top openings 158 through which air may exit the growth chamber 124. In some exemplary arrangements, the air is vented from the growth chamber 124 through the top openings 158 by exhaust fans 160. Air is forced into the growth chamber 124 and may be recirculated by make-up air units (air units) 162, that may be disposed above openings 136, 144. The air units 162 may also include heating elements 164 that allow manipulation of the temperature of the air being delivered to the growth chamber 124. The air units 162 may include a first louver 166 for blending air from the environment into the A plurality of air speed sensors 170 are located are various points in the growth chamber 124 to detect the speed of air flow in the growth chamber 124. The air speed sensors 170 are operatively connected to the controller 134 that can be used to target a desired vapor pressure deficit ("VPD") to produce an optimized growing environment within the growth chamber 124. The hydroponic system 100 utilizes a combination of evaporative cooling pads 146, air units 162 and the sensors 132, 164, 170 to adjust the growing environment within the growth chamber 124 to maintain a proper VPD level in the growth chamber 124 to achieve optimal plant growth.

Figure 8:
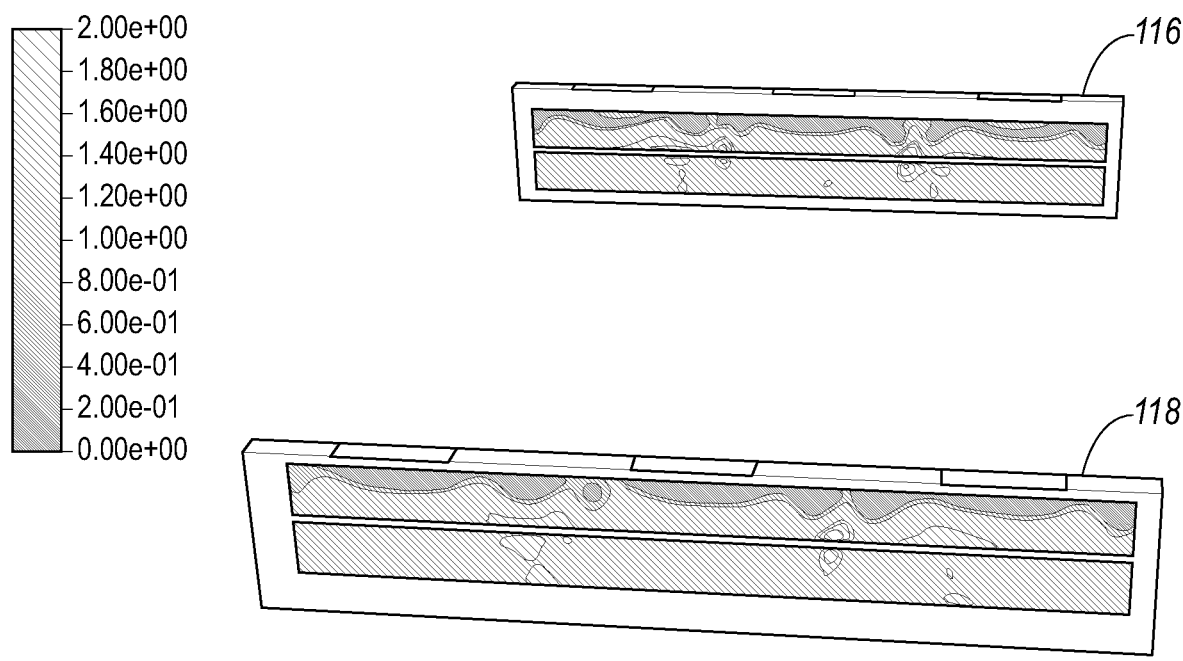
FIG. 8 is a representation of air velocity through the grow room for the arrangement in FIG. 1.

As in hydroponic system 10, in operation, air unit 162 and the exhaust fan 160 are operatively connected to the controller 134 so as to control the flow of air into and out of the growth chamber 124 so as to achieve a circulation of air. In particular, the air supply unit is configured to draw air from the environment into the first and second cavities 140, 148 through openings 142a, 150a and into the center of the growth chamber 124 through side openings 142b, 150b. In one exemplary arrangement, the first and second end walls 116, 118 may contain one or more adjustable louvers 168 to selectively control the air flow through the side openings 142b, 150b of the corresponding first and second end walls 116, 118. The air will exit the side openings 142b, 150b of the corresponding first and second end walls 116, 118 through the evaporative cooling pads 146, as shown in FIGS. 5A-5B, which will cool the temperature of the air to reduce humidity of the air within the growth chamber 124. If an increased temperature is required, heating elements in the air units 162 positioned above openings 142a and 150a may be utilized or the controller 134 may be operable to increase the intensity of the HEAT lights 128a, or a combination of both. As shown in the exemplary arrangement of FIG. 8, the air velocity is reasonably uniform, with a peak velocity of under 2 m/s. In one exemplary arrangement, the peak velocity is around 1.9 m/s.

Figure 9:
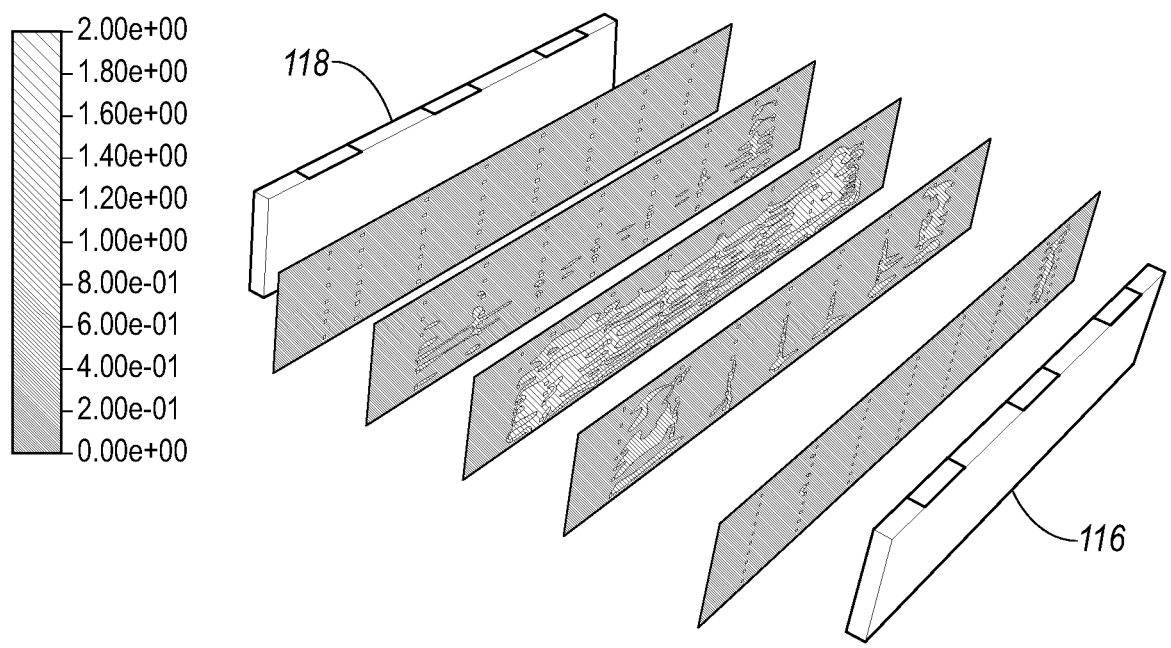
FIG. 9 is heat map illustrating temperature contours within growing racks for the arrangement in FIG. 3.
Figure 10A:
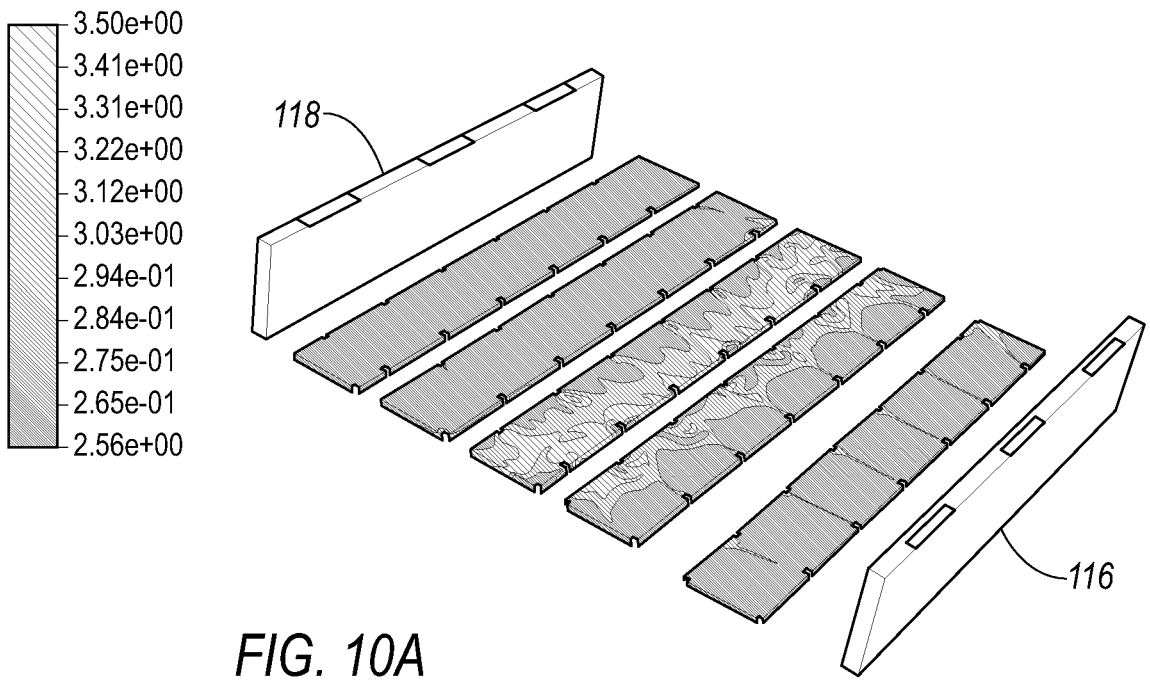
FIGS. 10A-10F are heat maps illustrating temperature contours on the plants within different growing levels of growing racks for the arrangement in FIG. 3.
Figure 10B:
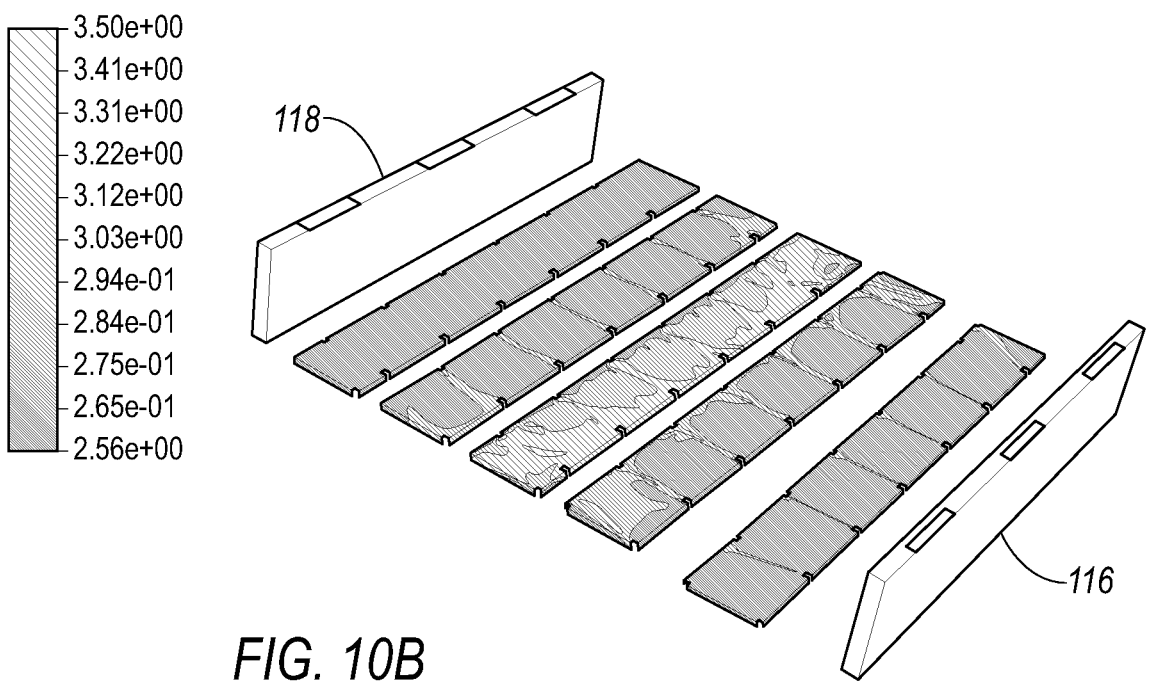
Figure 10C:
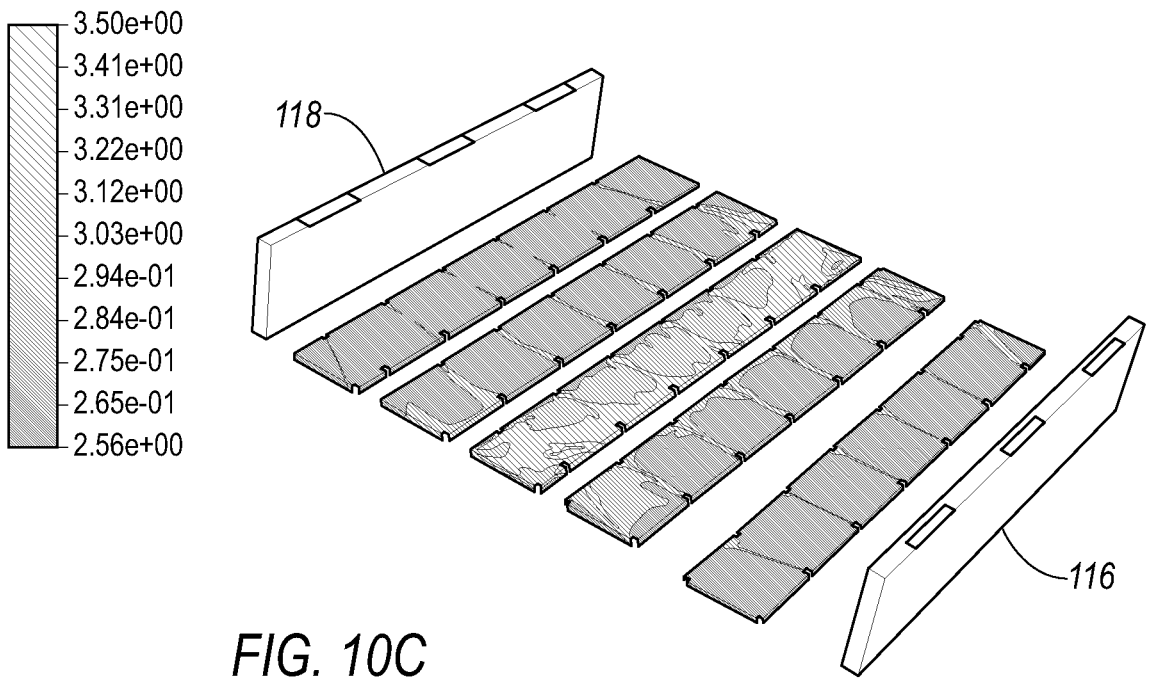
Figure 10D:
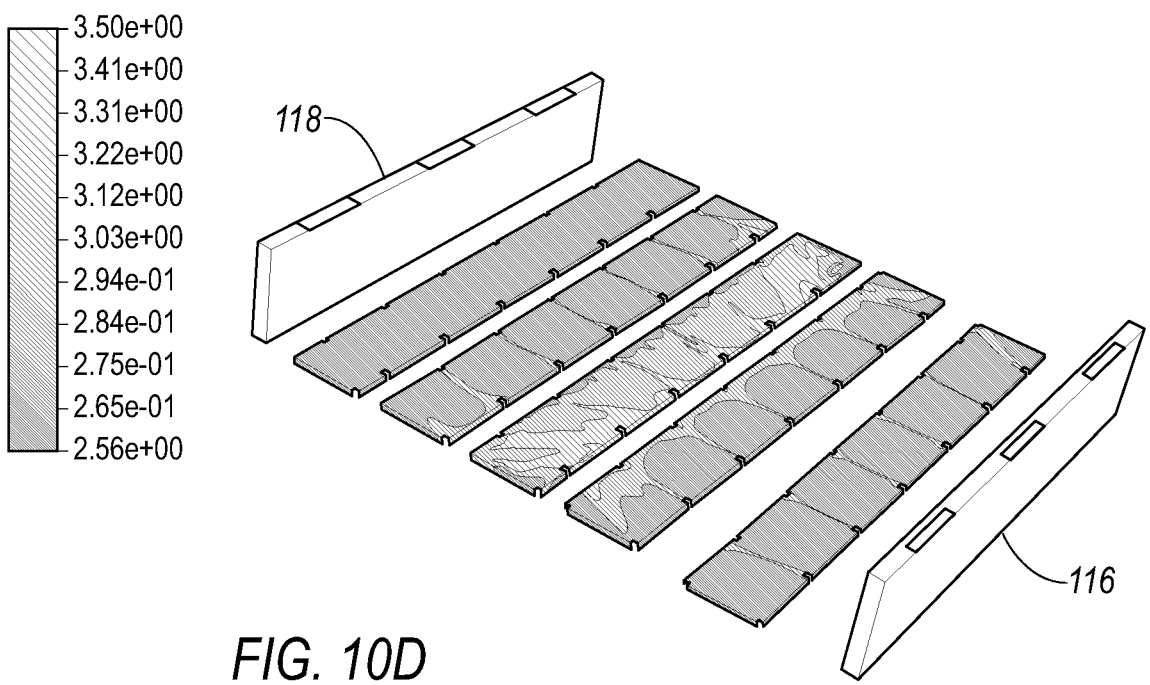
Figure 10E:
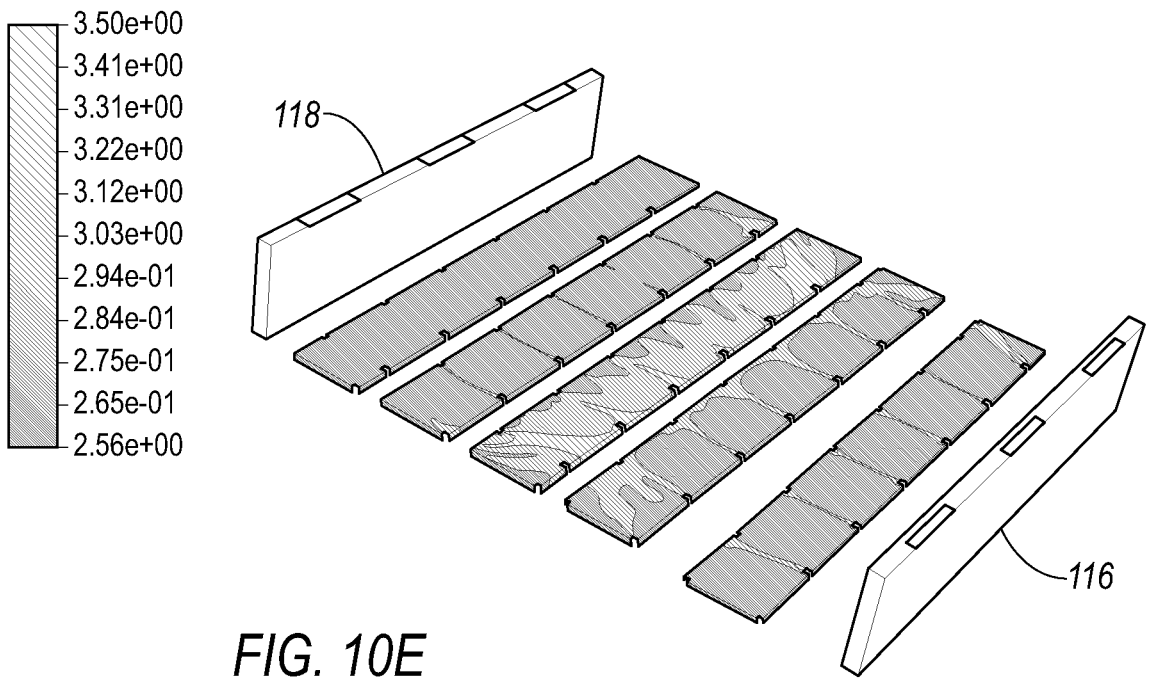
Figure 10F:
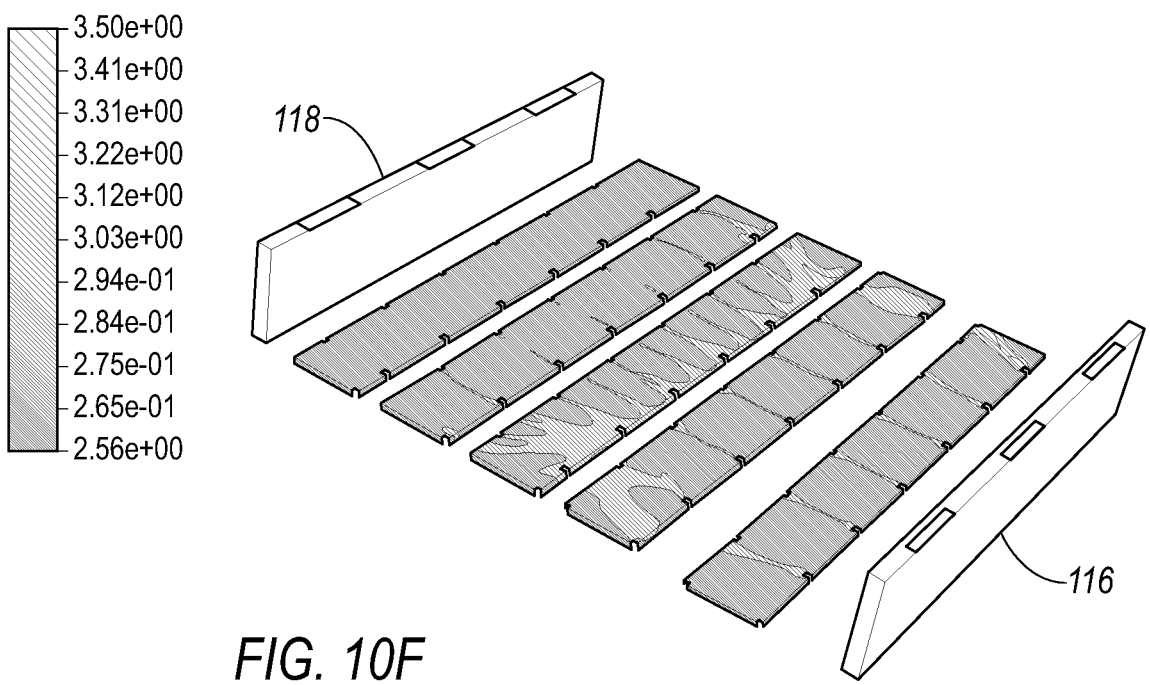
Figure 11:
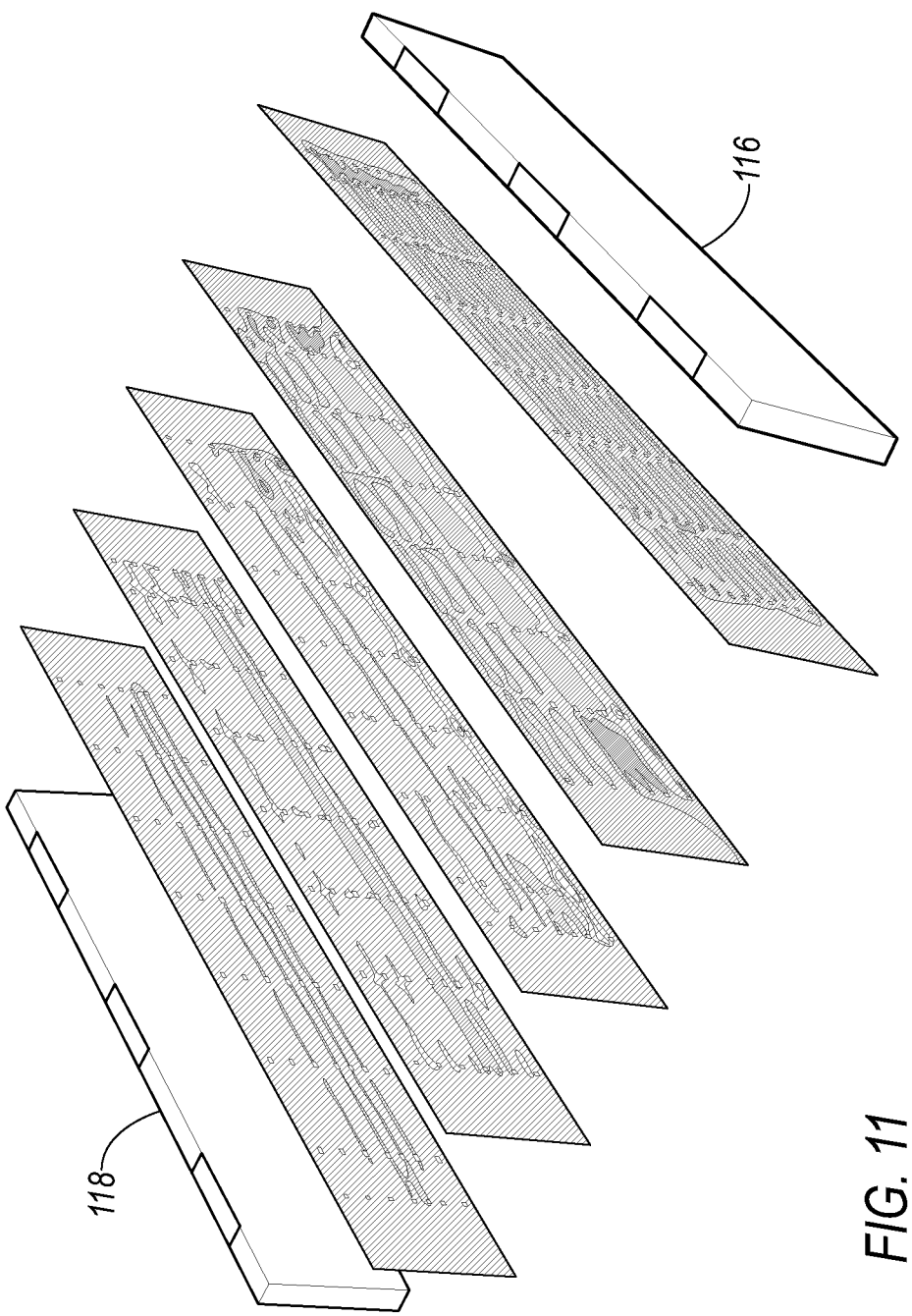
FIG. 11 is a heat map illustrating relative humidity contours within growing racks for the arrangement in FIG. 3.

As demonstrated in FIGS. 3 and 9, the exhaust fans 160 located at the top center of the growth chamber 124 will pull the air to flow through each vertical plant layer of a respective growing rack 126a-126f at an optimal speed to prevent stagnant air pockets, thereby preventing high humidity levels. For example, referring to FIG. 9, a representative heat map of the relative humidity contours throughout the growth chamber 124 is relatively constant. Indeed, as demonstrated in FIGS. 10A-10F, due to the constant velocity of the air flow through the racks 24, 26, the temperature through the individual levels of racks 124, 126 is also maintained to be relatively consistent throughout their respective length of the rack, and their respective height. Referring to FIG. 11, a representative heat map of the relative humidity contours throughout the growth chamber 124 is also shown to be relatively uniform, with the exception of the bottom center of the growth chamber 124.

It should be appreciated that the system 10 and 100 generates a heat efficiency which reduces heating and cooling costs relative to current systems. In particular, the temperature of the lighting unit 28, 128 may generate an operating temperature of 100 degrees Fahrenheit. By forcing air from opposite ends of the growth chamber 24, 124 and drawing the air through the exhaust fan 60, 160 the growth chamber 23, 124 is effectively warmed by the lighting unit 28, 128 by circulation through the growth chamber 24, 124 via ducts 60a, 60b so as to reduce the need for actuating the heating element 64, 164. In addition, in instances where the temperature within the growth chamber 24, 124 needs to be lowered, the air units 62, 162 may be actuated so as to blend exterior air into the growth chamber 24, 124 to lower the temperature. Another aspect of the system 10, 100 is the interplay between the air unit and the exhaust fan, which facilitates a predetermined pressure/VPD by controlling the air speed generated by the air units 62, 162 and the release of air/pressure by the exhaust fan 60, 160. Accordingly, these aspects provide for a growth chamber 24, 124 with a predetermined environment optimal for plant growth.

It will be appreciated that the hydroponic system and its components described herein have broad applications. The foregoing embodiments were chosen and described in order to illustrate principles of the apparatuses as well as some practical applications. The preceding description enables others skilled in the art to utilize apparatuses in various embodiments with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this invention may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed is:

1. A hydroponic system for optimizing a growing environment, comprising:
    a first side wall, a second side wall, a first end wall, a second end wall, a bottom surface and a top wall coupled together to define a growth chamber, the first end wall opposite of the second end wall;
    one or more growing racks disposed in the growth chamber and including a plurality of vertically arranged shelves spaced apart from each other to define a gap, the gap having a middle interposed between the first end wall and the second end wall;
    wherein the first end wall includes a first cavity and a pair of side openings spaced apart from the bottom surface and the top wall of the growth chamber and open to the growth chamber and the second end wall includes a second cavity and a second opening open to the growth chamber;
    an air unit configured to force air into the first cavity of the first end wall and the second cavity of the second end wall, through the pair of side openings, into the growth chamber, and through the gap between each of the plurality of vertically arranged shelves of the one or more growing racks to define a forced airflow path;
    an exhaust fan disposed on the top wall and centered with respect to the growth chamber, the exhaust fan configured to draw air through the middle of the growing racks and out of the growth chamber; at least one evaporative cooling pad disposed on the pair of side openings of the first end wall, wherein air forced into the growth chamber is directed through the evaporative cooling pad;
    a humidity sensor mounted to one of the plurality of vertically arranged shelves, the humidity sensor configured to detect a relative humidity at a plant disposed within a corresponding one of the plurality of vertically arranged shelves; and
    a controller configured to achieve a desired vapor pressure deficit through the middle of the gap, the controller being configured to process the relative humidity to adjust a saturation of the at least one evaporative cooling pad, an operation of the air unit, and an operation of the exhaust fan to maintain the desired vapor pressure deficit.

2. The hydroponic system of claim 1, wherein the air unit includes a first louver, the first louver configured to move between an open and closed position so as to control an intake of air from the environment.

3. The hydroponic system of claim 1, wherein the air unit includes a heating element configured to heat the air forced into the growth chamber.

4. The hydroponic system of claim 3, further including a temperature sensor configured to detect the temperature of the growth chamber, the controller processing the detected temperature to adjust at least one of the air unit, the exhaust fan and the heating element to achieve the desired vapor pressure deficit.

5. The hydroponic system of claim 3, further including an air speed sensor configured to detect the speed of the air flow in the growth chamber, the controller processing the speed of the air flow to adjust an output of at least one of the air unit and the exhaust fan.

6. The hydroponic system of claim 3, wherein the top wall further includes a top opening, the exhaust fan operable to draw air from the growth chamber and release the air drawn into the environment through the top opening.

7. The hydroponic system of claim 6, further including a third louver operatively connected to the top opening, the controller configured to actuate the third louver so as to control the release of drawn air into the environment.

8. The hydroponic system of claim 6, further including a duct fluidly connecting the top opening to the air unit so as to recirculate the air and form a closed system.

9. The hydroponic system of claim 3, wherein the controller further adjusts the heating element to achieve the desired vapor pressure deficit.

10. The hydroponic system of claim 1, wherein the air unit further comprises filters to inhibit bacteria growth.

11. The hydroponic system of claim 1, wherein the air unit is a pair of air units, one of the pair of air units is fluidly coupled to the first cavity of the first end wall, and the other of the pair of air units is fluidly coupled to the second cavity of the second end wall.

12. The hydroponic system of claim 1, further including at least one evaporative cooling pad disposed on the second opening of the second end wall, wherein air forced into the growth chamber is directed through the evaporative cooling pad.

13. The hydroponic system of claim 12, wherein the at least one evaporative cooling pad is a pair of evaporative cooling pads, wherein each of the pair of evaporative cooling pads is disposed on a vertical plane.

14. The hydroponic system of claim 13, further including a second louver disposed in each of the first end wall and the second end wall, the second louver disposed between the pair of evaporative cooling pads and adjustable so as to control a flow of air to a respective one of the pair of evaporative cooling pads.

15. The hydroponic system of claim 12, further including a water supply operatively coupled to the at least one evaporative cooling pad.

16. The hydroponic system of claim 15, further including a pump configured to supply water from the water supply to the at least one evaporative cooling pad.

17. The hydroponic system of claim 16, wherein the controller is configured to actuate the pump to control an amount of water to the at least one evaporative cooling pad.

18. The hydroponic system of claim 1, wherein the second end wall includes a second pair of side openings spaced apart from the bottom surface and the top wall of the growth chamber.

19. The hydroponic system of claim 1, further including a plurality of light units disposed on a bottom surface of the plurality of vertically arranged shelves.

20. A hydroponic system for optimizing a growing environment, comprising:
- a first side wall, a second side wall, a first end wall, a second end wall, a bottom surface and a top wall coupled together to define a growth chamber, the first end wall opposite of the second end wall;
- one or more growing racks disposed in the growth chamber and including a plurality of vertically arranged shelves spaced apart from each other to define a gap, the gap having a middle interposed between the first end wall and the second end wall;
- wherein the first end wall includes a first cavity and a pair of side openings spaced apart from the bottom surface and the top wall of the growth chamber and open to the growth chamber and the second end wall includes a second cavity and a second opening open to the growth chamber;
- a lighting unit including a plurality of lights coupled to a bottom surface of the vertically arranged shelves;
- an air unit configured to force air into the first cavity of the first end wall and the second cavity of the second end wall, through the pair of side openings, into the growth chamber, and through the gap between each of the plurality of vertically arranged shelves of the one or more growing racks to define a forced airflow path;
- an exhaust fan disposed on the top wall and centered with respect to the growth chamber, the exhaust fan configured to draw the forced airflow path through the middle of the growing racks and out of the growth chamber;
- at least one evaporative cooling pad disposed on the pair of side openings of the first end wall, wherein the forced airflow path is directed through the at least one evaporative cooling pad;
- a temperature sensor configured to detect the temperature at the plant generated by the lighting unit;
- a humidity sensor mounted to one of the plurality of vertically arranged shelves and configured to detect a humidity at a plant disposed within a corresponding one of the plurality of vertically arranged shelves; and
- a controller configured to process the detected humidity and temperature to adjust a saturation of the at least one evaporative cooling pad and adjust at least one of the air unit and the exhaust fan to achieve the desired vapor pressure deficit.

\* \* \* \* \*